United States Patent
Cooklev et al.

(10) Patent No.: US 6,772,123 B2
(45) Date of Patent: Aug. 3, 2004

(54) METHOD AND SYSTEM FOR PERFORMING SPEECH RECOGNITION FOR AN INTERNET APPLIANCE USING A REMOTELY LOCATED SPEECH RECOGNITION APPLICATION

(75) Inventors: Todor Cooklev, Walnut Creek, CA (US); Darrin Gibbs, Jordon, UT (US); Mark Gray, Jordon, UT (US); Ken Morley, Draper, UT (US)

(73) Assignee: 3Com Corporation, Santa Clara, CA (US)

( * ) Notice: Subject to any disclaimer, the term of this patent is extended or adjusted under 35 U.S.C. 154(b) by 343 days.

(21) Appl. No.: 09/727,990

(22) Filed: Nov. 30, 2000

(65) Prior Publication Data

US 2002/0065660 A1 May 30, 2002

(51) Int. Cl.7 .............................................. G10L 21/00
(52) U.S. Cl. .................. 704/270.1; 704/270; 379/88.01
(58) Field of Search .............................. 704/270, 270.1, 704/275, 257; 374/88.01

(56) References Cited

U.S. PATENT DOCUMENTS

| | | | | |
|---|---|---|---|---|
| 6,125,284 A | * | 9/2000 | Moore et al. ............... | 455/557 |
| 6,157,705 A | * | 12/2000 | Perrone .................... | 379/88.01 |
| 6,304,573 B1 | * | 10/2001 | Hicks, III .................... | 370/401 |
| 6,327,343 B1 | * | 12/2001 | Epstein et al. ........... | 379/88.01 |
| 6,334,103 B1 | * | 12/2001 | Surace et al. ............... | 704/257 |
| 6,418,199 B1 | * | 7/2002 | Perrone .................... | 379/88.01 |
| 6,477,240 B1 | * | 11/2002 | Lim et al. .................. | 379/67.1 |
| 6,526,335 B1 | * | 2/2003 | Treyz et al. ................... | 701/1 |
| 6,606,611 B1 | * | 8/2003 | Khan .......................... | 706/10 |

OTHER PUBLICATIONS

Zhemin Tu, Philipos C. Loizou, "Speech Recognition Over the Internet Using Java", 1999, IEEE 1CASSP.

* cited by examiner

*Primary Examiner*—Susan McFadden

(57) ABSTRACT

A method and system for performing speech recognition for an internet appliance using a remotely located speech recognition application. The invention includes an internet appliance that is connected through a network with either a stand-alone computer or a server computer located at the Internet Service Provider. Verbal commands directed to an internet appliance are received as analog signals and converted to digital signals. The digital signals are remotely translated into a set of instructions by a dedicated hardware device or a software program that operates a speech recognition application at either a stand-alone computer or server computer located at an Internet Service Provider in a form recognizable by the internet appliance. The internet appliance receives and executes the translated instructions.

30 Claims, 5 Drawing Sheets

METHOD AND SYSTEM FOR PERFORMING SPEECH RECOGNITION FOR AN INTERNET APPLIANCE USING A REMOTELY LOCATED SPEECH RECOGNITION APPLICATION

BACKGROUND OF THE INVENTION

1. Field of the Invention

The present invention relates to the field of performing speech recognition. The present invention is directed to performing speech recognition for an internet appliance at a remotely located speech recognition application.

2. Related Art

In a technology that generates computers that are bigger, faster, more complicated and expensive, a growing market of low cost and specialized computer systems that are part of a larger networked system has emerged. One of the new categories of computer systems is the "internet appliance".

An internet appliance is an embedded electronic system at the edge of the Internet. The internet appliance is inexpensive, simple to use, and usually designed to perform a dedicated or narrow range of functions. It maintains its low cost by minimizing hardware resources, including its memory capacity, processor power, and size. Some internet appliances are portable. Since these devices are connected to a network, such as the Internet, these internet appliances rely on a remote computer with its associated features to do any function that a computer may do, including storage of data and performance of an application.

The internet appliance focuses on one particular function to simplify operations, maximize convenience, and reduce cost. For example, an internet appliance may provide limited access to the Internet by featuring selected web sites, one of which could be a web site providing weather information. As selected by the user, the internet appliance might continually display updated weather information with data from the specific weather web site for any particular area without any further input from the user.

Internet appliances will eventually become more prevalent throughout the home or business in performing numerous tasks. Virtually any household appliance that can incorporate a digital interface can be an internet appliance. Complex functions such as heating and cooling of the home interior, answering and recording telephone messages, sprinkling the yard, securing the home with a security system, accessing the Internet, etc., or more simplistic functions such as making coffee or toast can be controlled using an internet appliance.

Previously, internet appliances had limited speech recognition capabilities. FIG. 1 shows an electronic device 100 with speech recognition capabilities. Device 100 needs sophisticated hardware in order to run the algorithms needed for speech recognition. As such, device 100 is typically a stand-alone personal computer with a fast digital signal processor 115 to perform the speech recognition application 130 embedded within device 100 to maximize real time response times. Speech is inputted into voice recorder 110 in analog form. A converter 125 converts the analog signal to digital form whereupon the digital signal processor 115 operates the speech recognition application 130 to translate the input into text form that is stored in memory 120 and viewed at the display 105.

Because of its simplistic construction and emphasis on reducing cost by limiting the hardware attached to it, an internet appliance would have limited capability to independently run a speech recognition application without excessively increasing the size, power, and cost of the internet appliance.

FIG. 2 shows a network architecture 200 for performing speech recognition that is explained by Z. Tu and P. Loizou in their paper, "Speech Recognition Over the Internet Using Java," IEEE ICASSP 1999, Phoenix, Ariz. This architecture requires that the voice data is recorded at the appliance 205 and sent through a communication link 210 to the Internet Service Provider 220, and then over the Internet 225 to the proxy server 230. The proxy server 230 is pointed at a web site, or URL address, having a digital signal processor disposed therein that runs a speech recognition application. The speech recognition application translates the input voice data into text. Results from the speech recognition application are then sent back over the same communications network to the internet appliance 205.

This network architecture 200 overcomes the problem of locating the speech recognition application along with the necessary hardware to run the application on the internet appliance 205 by utilizing a world wide web browser located on appliance 205 to do speech recognition via a remote proxy server 230 pointed at a web site with a speech recognition application disposed therein. However, the internet appliance requires a web browser which adds undesirable cost and complexity to the appliance. A further disadvantage to this architecture is the inconvenience of pointing the browser to the specific web site that contains the speech recognition application. Yet another disadvantage is the inherent losses and delays associated with the Internet architecture. Since the web site is located within the Internet, the end to end round trip response time will be affected by queuing delays within the network switches, available bandwidth, packet reassembly delays, and processing delays by the speech recognition application. These previous delay limitations may also result in losses of data.

Thus, a need exists to provide an efficient and cost-effective method and system for performing speech recognition for an Internet appliance.

SUMMARY OF THE INVENTION

The present invention provides a method and system for performing speech recognition for an internet appliance using a remotely located speech recognition application. Specifically, a method and system for performing speech recognition is provided such that the internet appliance can receive and execute sophisticated verbal commands. Additionally, the present invention allows for inexpensive and easy to operate internet appliances. Also, the present invention provides a method and system for performing speech recognition that is separate from an internet appliance. Moreover, the present invention provides a method and system for performing speech recognition for an internet appliance with real time response characteristics.

The present invention provides these advantages and others not specifically mentioned above but described in the sections to follow. Specifically, the present invention discloses a method and system for performing speech recognition for an internet appliance using a remotely located speech recognition application. The invention includes an internet appliance that is connected through a network with either a stand-alone computer or a server computer located at the Internet Service Provider. Verbal commands directed to an internet appliance are received as analog signals and converted to digital signals. The digital signals are remotely translated into a set of instructions by a dedicated hardware device or a software program that operates a speech recognition application at either a stand-alone computer or server computer located at an Internet Service Provider in a form recognizable by the internet appliance. The internet appliance receives and executes the translated instructions.

These and other objects and advantages of the present invention will no doubt become obvious to those of ordinary skill in the art after having read the following detailed description of the preferred embodiments which are illustrated in the various drawing figures.

DETAILED DESCRIPTION OF THE INVENTION

Figure 1:
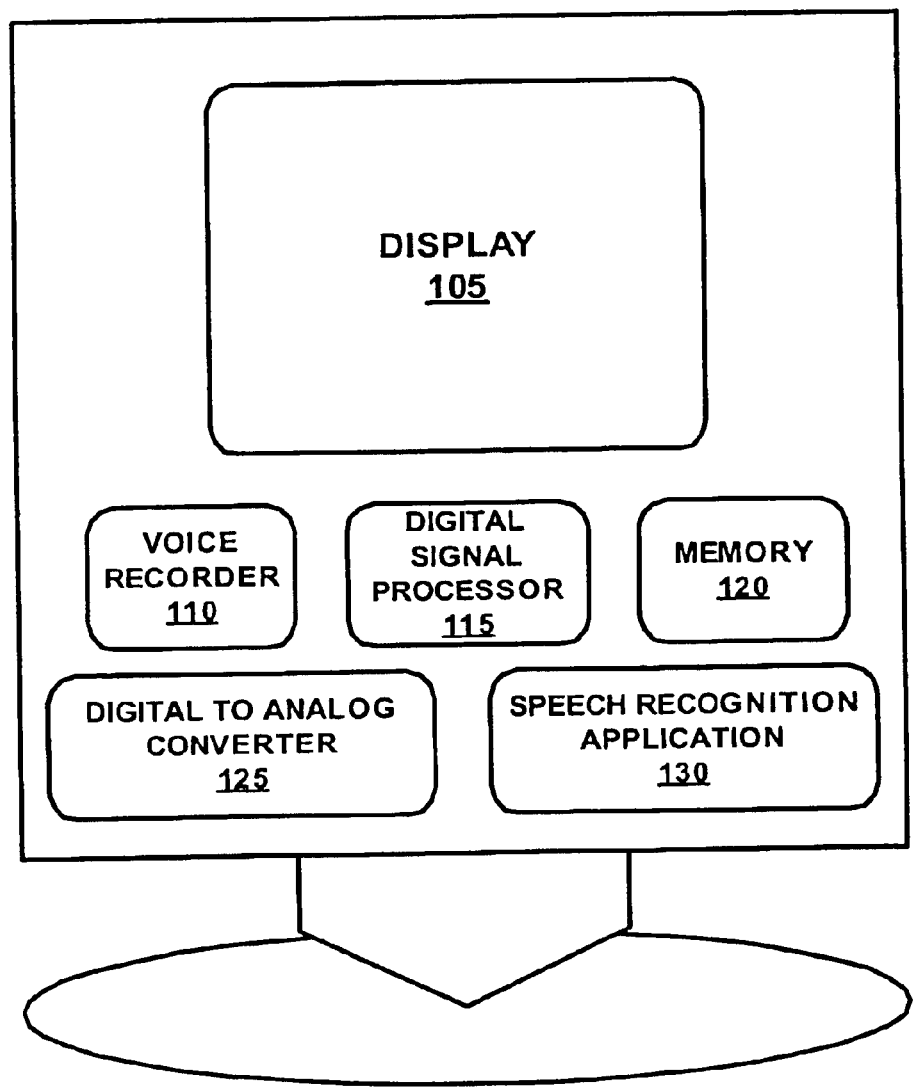
FIG. 1 illustrates a diagram of a stand-alone computer system of the prior art that has speech recognition capabilities.
Figure 2:
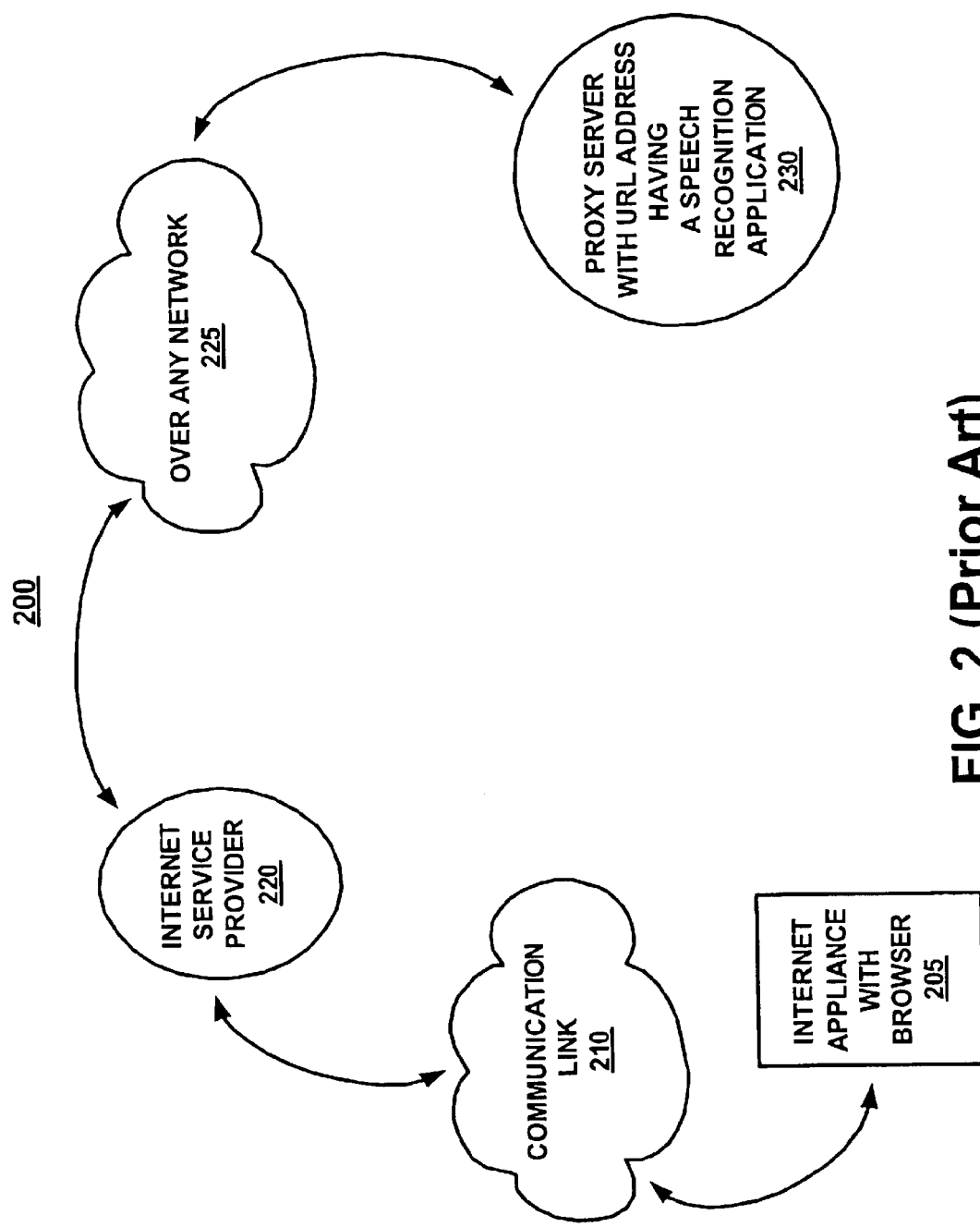
FIG. 2 illustrates a network architecture used in the prior art for performing speech recognition.

Reference will now be made in detail to the preferred embodiments of the present invention, a method and system for performing speech recognition, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Accordingly, a method and system for performing speech recognition for an internet appliance using a remotely located speech recognition application is described.

An internet appliance with speech recognition capabilities as described in the present invention provides some immediate benefits. An internet appliance is more convenient and efficient when operated in a hands free environment. Instead of physically interacting with the internet appliance to change the variables of operation, verbal commands can be given. This would make an internet appliance more convenient especially if there is constant or multiple interactions with the internet appliance, or if a user needed to simultaneously interact with multiple Internet appliances. Additionally, persons with physical disabilities would find the hands free operation of an internet appliance desirable. Also, the internet appliance would be easier to use when responding to verbal prompts rather than strict input command codes via a control panel.

Figure 3:
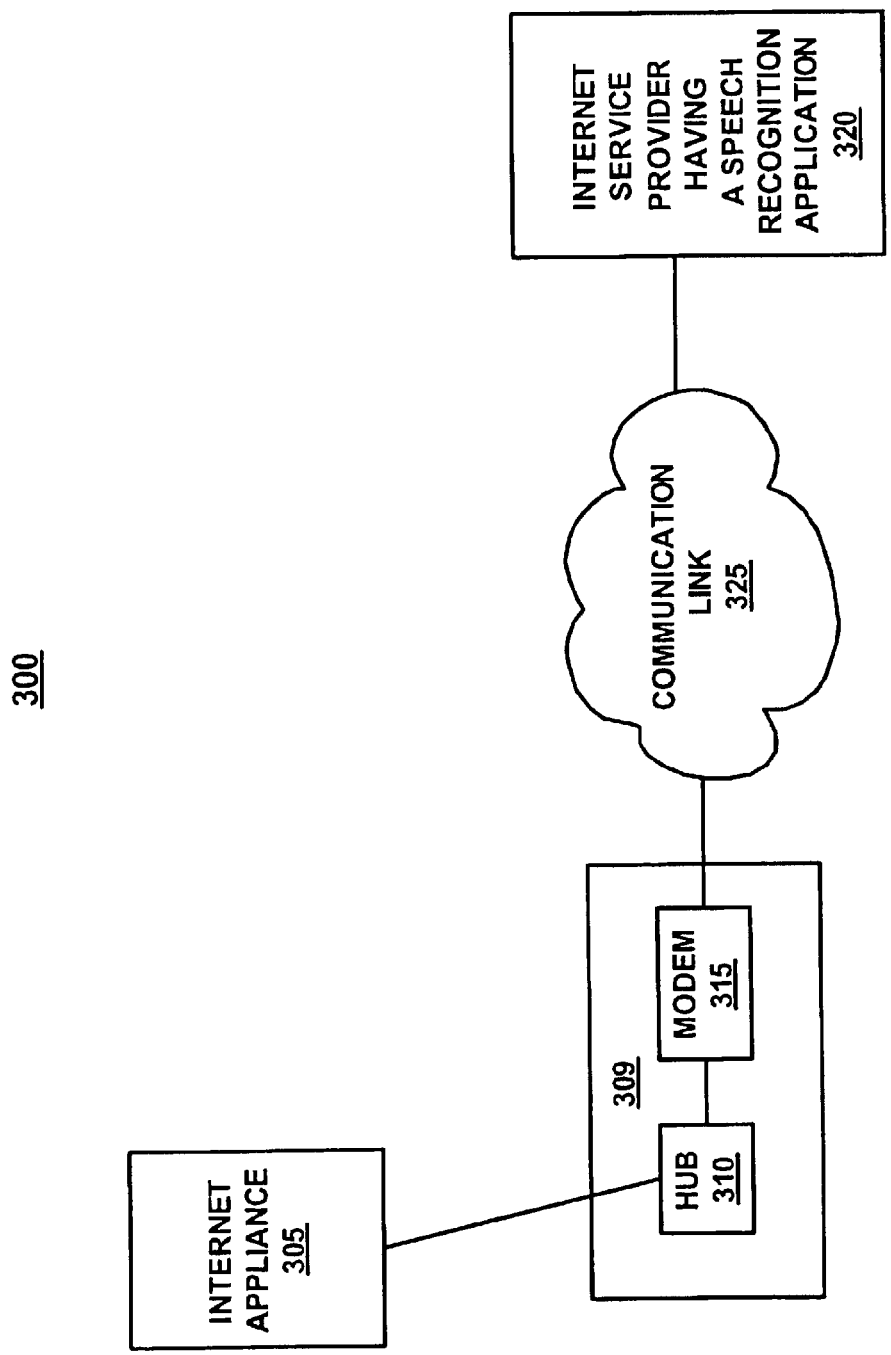
FIG. 3 illustrates a diagram of an exemplary network architecture for performing speech recognition in accordance with an embodiment of the present invention.

FIG. 3 illustrates an exemplary network architecture 300 that is used for performing speech recognition using a remotely located speech recognition application. The speech recognition may be performed at a dedicated hardware device, a software program, or a combination thereof. The dedicated hardware device may contain a processor, such as a digital signal processor (hereinafter referred to as "DSP") that is capable of performing speech recognition.

In FIG. 3, an internet appliance 305 is connected to a residential gateway 309. The residential gateway 309 contains a hub 310 for directing signal traffic to various electronic devices within a home network and a modem 315 for transmitting signal traffic through a communications network outside the home network. The residential gateway 309 is connected via any communications link 325 to an Internet Service Provider (hereinafter referred to as "ISP") 320. In one embodiment, the ISP 320 has a server computer disposed therein with a digital signal processor to run the speech recognition application. Providing speech recognition capabilities at ISP 320 would be one way to distinguish its services from services provided by other ISPs. Some possible communication links 325 are wireless, narrowband, and broadband connections. Broadband connections such as Digital Subscriber Line are more preferable over wireless and narrowband connections because of its continuous connection to any Internet Service Provider 320 and its increased transmission of data.

Since the speech recognition application is remotely located at the Internet Service Provider 320 which is coupled to network architecture 300, internet appliance 305 can rely on the power of the server computer located at ISP 320 to perform the speech recognition thereby maintaining its low cost features by locating the digital signal processor separate from internet appliance 305. Further, since the internet appliance 305 is only connected to the ISP 320 there is no need to have a web browser located in the appliance 305 thereby further reducing its cost. Also, since the internet appliance 305 is always connected to the ISP 320, there is no need to have a user point the internet appliance to the ISP 320, thereby making the appliance 305 easier and more convenient to use. Finally, since there is no actual connection to the Internet, the usual delays and losses due to queuing within the network switches, packet reassembly, and available bandwidth never materialize. Thus, the quality of service is higher in network architecture 300 of the present embodiment than a network architecture utilizing the Internet. Further, in network architecture 300 of the present embodiment, the round trip response time of the internet appliance with speech recognition capabilities will increase to approximate real time.

Figure 4:
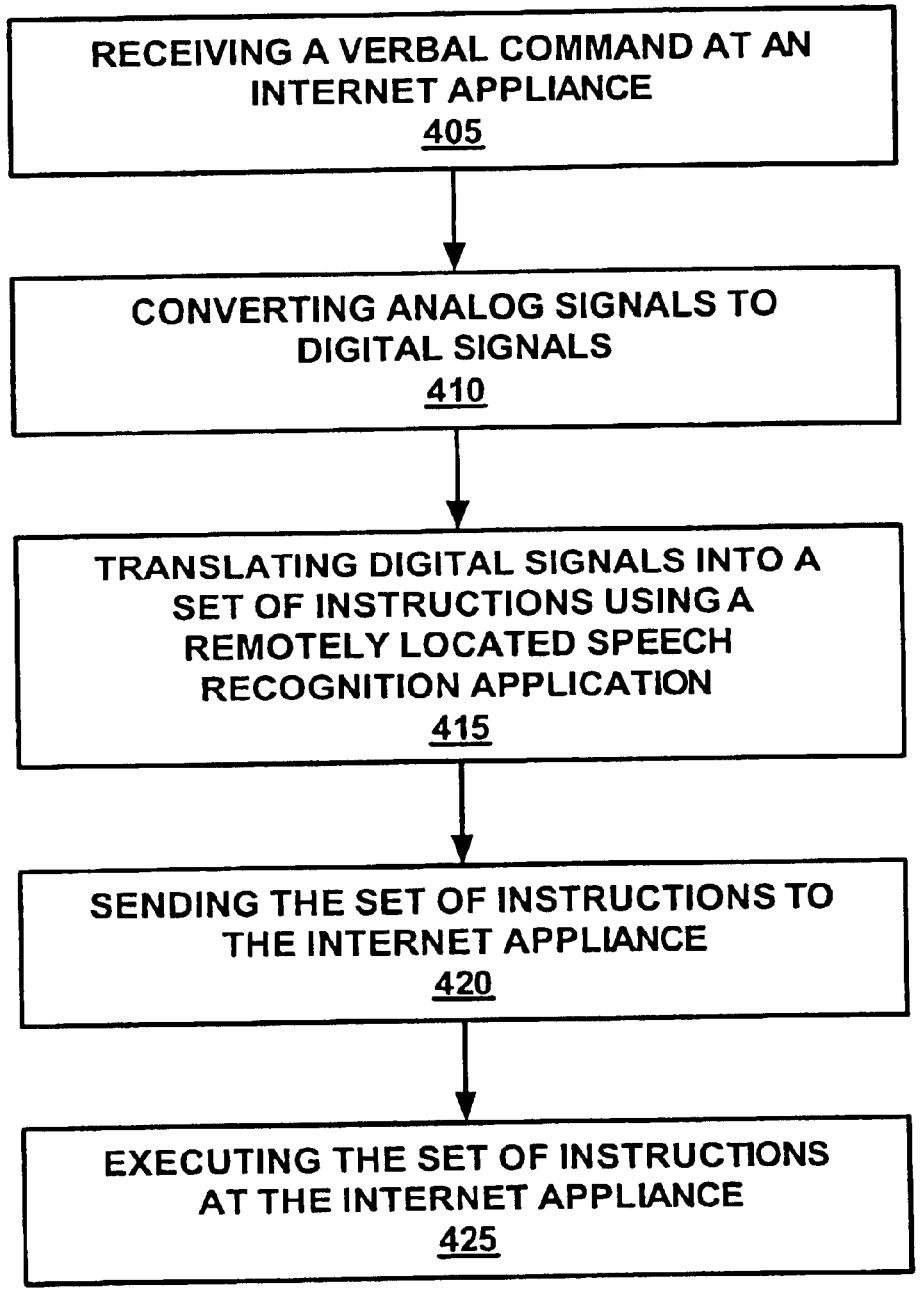
FIG. 4 is a flow diagram illustrating steps in a method for performing speech recognition in accordance with an embodiment of the present invention.

FIG. 4 illustrates a flow chart of steps in accordance with a method for performing speech recognition for an internet appliance using a remotely located speech recognition application. Referring to FIGS. 3 and 4, one embodiment of the present invention is shown. In step 405, a verbal command is received at an internet appliance 305. The verbal command is comprised of analog signals. The analog signals are then converted into digital signals in step 410. The conversion can take place at any number of locations including at the modem 315, the Internet Service Provider 320 that has the speech recognition application disposed therein, or even at the internet appliance 305, although this would further increase the cost of the internet appliance 305. In step 415, the server computer located at ISP 320 runs the speech recognition application to translate the digital signals into a set of instructions in a format that is recognizable by the internet appliance 305. In step 420, the set of instructions are sent back to the internet appliance 305, and in step 425, the internet appliance executes the set of instructions.

Figure 5:
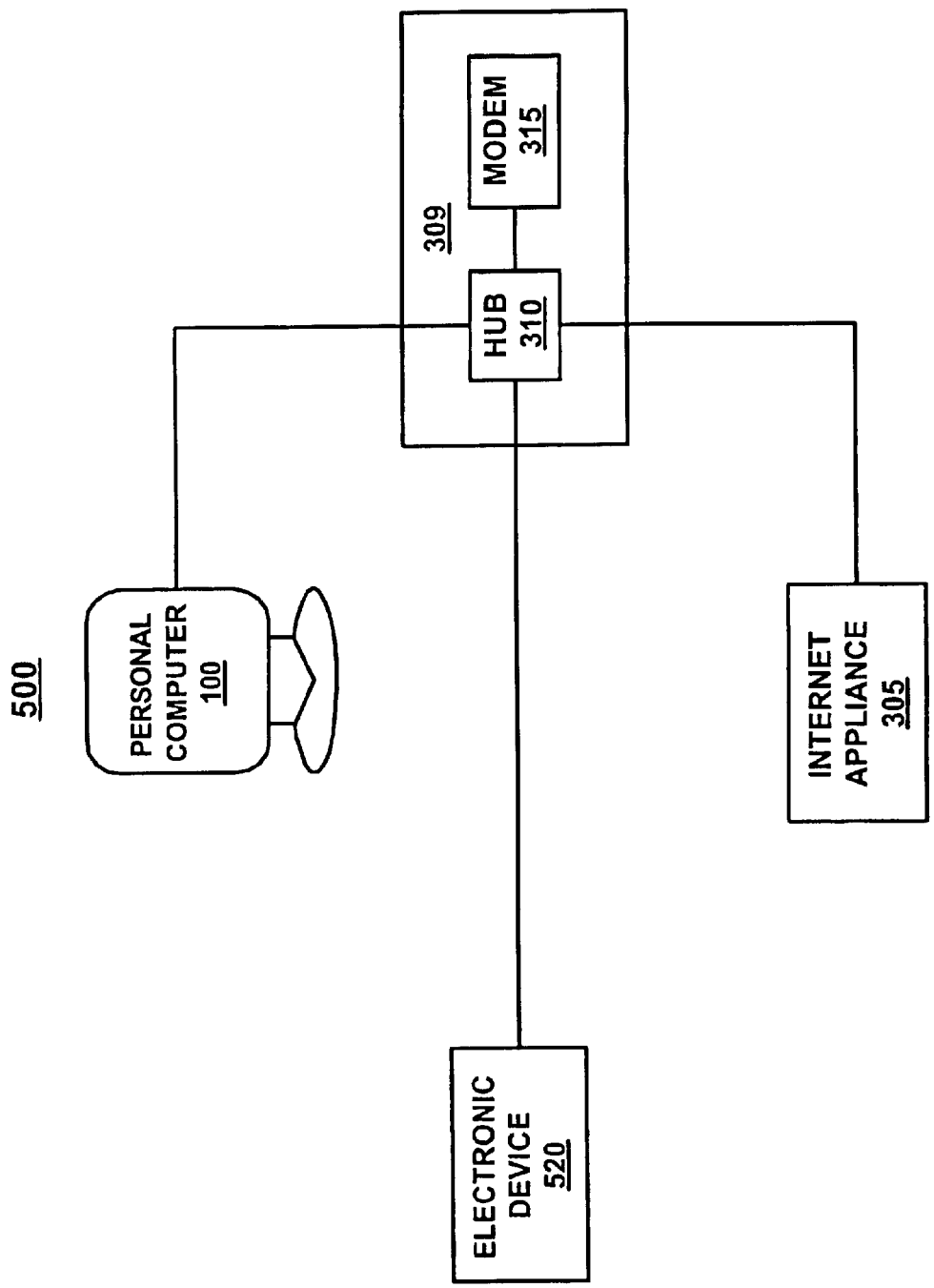
FIG. 5 illustrates a diagram of an exemplary network architecture for performing speech recognition in accordance with an embodiment of the present invention.

FIG. 5 illustrates another exemplary network architecture 500 that is used for performing speech recognition using a remotely located digital signal processor that runs the speech recognition application. In the present embodiment, an internet appliance 305 is connected to a residential gateway 309. The residential gateway 309 contains a hub 310 for directing signal traffic to various electronic devices within a home network, such as network architecture 500, and a modem 315 for transmitting signal traffic through a communications network outside the home network. It is envisioned that numerous internet appliances, as well as various laptop and stand-alone computers would be coupled to the home network. Personal computer 100, as depicted in FIG. 1, is coupled to the home network such that internet appliance 305 can communicate with personal computer 100. Personal computer 100 is capable of operating a speech recognition application. A dedicated hardware device, such as an expansion board in one of the personal computer's 100 expansion slots, or a software program located on personal computer 100, or a combination therein can perform the speech recognition application.

In one embodiment, personal computer 100 has a digital signal processor disposed therein that is capable of operating a speech recognition application. Since the speech recognition application is remotely located at personal computer 100 which is coupled to the home network, internet appliance 305 can rely on the power of the computer 100 to perform speech recognition thereby maintaining its low cost features by locating the digital signal processor separate from the internet appliance 305. Further, since the internet appliance 305 is only connected to the home network, there is no need to have a web browser located in the appliance 305 thereby holding down its cost. Also, since the internet appliance 305 is not connected to the Internet, there are none of the inherent problems of delay and loss usually associated with the Internet as discussed previously. Thus, the quality of service is higher than a network architecture utilizing the Internet, and the round trip response time of the internet appliance in a network architecture 500 of the present embodiment with speech recognition capabilities will increase to approximate real time.

Referring to FIGS. 4 and 5, another embodiment of the present invention is shown. In step 405, a verbal command is received at an internet appliance 305. The verbal command is comprised of analog signals. The analog signals are then converted into digital signals in step 410. The conversion can take place at any number of locations including at the modem 315, the personal computer 100, or even at the internet appliance 305 although this would further increase the cost of the internet appliance 305. In step 415, personal computer 100 runs the speech recognition application to translate the digital signals into a set of instructions in a format that is recognizable by the internet appliance 305. In step 420, the set of instructions are sent back to the internet appliance 305, and in step 425, the internet appliance executes the set of instructions.

The preferred embodiment of the present invention, a method and system for performing speech recognition, is thus described. While the present invention has been described in particular embodiments, it should be appreciated that the present invention should not be construed as limited by such embodiments, but rather construed according to the below claims.

What is claimed is:

1. A method of speech recognition comprising the steps of:
   receiving a verbal command at a device, said verbal command comprising analog signals;
   converting said analog signals to digital signals;
   sending said digital signals to a server computer located at an Internet Service Provider without the use of a browser at said device, said server computer located remotely from said device;
   translating said digital signals at said server computer into a set of instructions in a format recognizable by said device;
   sending said set of instructions to said device; and
   executing said set of instructions by said device.

2. A method as described in claim 1 wherein said conversion of said analog signals to said digital signals occurs at said device.

3. A method as described in claim 1 wherein said conversion of said analog signals to said digital signals occurs at said server computer.

4. A method as described in claim 1, wherein said translating said digital signals at a server computer further comprises:
   translating said digital signals at a digital signal processor at said server computer, wherein said server computer is located externally from said device.

5. A method as described in claim 1 comprising the step of sending said digital signals to said server computer.

6. A method as described in claim 1 further comprising a communications network whereby said device is coupled with said server computer.

7. A method as described in claim 1 wherein said device is an internet appliance.

8. A method of speech recognition comprising the steps of:
receiving a verbal command at a device, said verbal command comprising analog signals;
converting said analog signals to digital signals;
sending said digital signals to a personal computer without the use of a browser at said device, said personal computer located externally from said device;
translating said digital signals at said personal computer into a set of instructions in a format recognizable by said device;
sending said set of instructions to said device; and
executing said set of instructions by said device.

9. A method as described in claim 8 wherein said conversion of said analog signals to said digital signals occurs at said device.

10. A method as described in claim 8 wherein said conversion of said analog signals to said digital signals occurs at said personal computer.

11. A method as described in claim 8, wherein said translating said digital signals at said personal computer further comprises:
translating said digital signals at a digital signal processor at said personal computer.

12. A method as described in claim 8 comprising the step of sending said digital signals to said personal computer.

13. A method as described in claim 8 further comprising a communications network whereby said device is coupled with said personal computer.

14. A method as described in claim 8 wherein said device is an internet appliance.

15. A speech recognition system, comprising:
a device;
a server computer located at an Internet Service Provider;
a communications network for coupling said device with said server computer, wherein a method of speech recognition is performed comprising the steps of:
receiving a verbal command at said device, said verbal command comprising analog signals;
converting said analog signals to digital signals;
sending said digital signals to said server computer without the use of a browser at said device, said server computer located remotely from said device;
translating said digital signals at said server computer into a set of instructions in a format recognizable by said device;
sending said set of instructions to said device; and
executing said set of instructions by said device.

16. A speech recognition system as described in claim 15 wherein said conversion of said analog signals to said digital signals occurs at said device.

17. A speech recognition system as described in claim 15 wherein said conversion of said analog signals to said digital signals occurs at said server computer.

18. A speech recognition system as described in claim 15 wherein said translating said digital signals at said server computer in said method further comprises:
translating said digital signals at a digital signal processor at said server computer.

19. A speech recognition system as described in claim 15 comprising the step of sending said digital signals to said server computer.

20. A speech recognition system as described in claim 15 wherein said device is an internet appliance.

21. A speech recognition system, comprising:
a device;
a personal computer;
a communications network for coupling said device with said personal computer, wherein a method of speech recognition is performed comprising the steps of:
receiving a verbal command at said device, said verbal command comprising analog signals;
converting said analog signals to digital signals;
sending said digital signals to said personal computer without the use of a browser at said device, said personal computer located externally from said device;
translating said digital signals at said personal computer into a set of instructions in a format recognizable by said device;
sending said set of instructions to said device; and
executing said set of instructions by said device.

22. A speech recognition system as described in claim 21 wherein said conversion of said analog signals to said digital signals occurs at said device.

23. A speech recognition system as described in claim 21 wherein said conversion of said analog signals to said digital signals occurs at said personal computer.

24. A speech recognition system as described in claim 21 wherein said translating said digital signals at said personal computer in said method further comprises:
translating said digital voice signals at a digital signal processor at said personal computer.

25. A speech recognition system as described in claim 21 comprising the step of sending said digital signals to said personal computer.

26. A speech recognition system as described in claim 21 wherein said device is an internet appliance.

27. A method of speech recognition comprising the steps of:
receiving a verbal command at a device, said verbal command comprising analog signals;
converting said analog signals to digital signals;
sending said digital signals to a computer located externally from said device without the use of a browser, wherein said computer translates said digital signals into a set of instructions in a format recognizable by said device, and wherein said computer is located remotely from said device; and
receiving said set of instructions at said device; and
executing said set of instructions.

28. The method of claim 27, wherein said computer comprises a server computer located at an Internet Service Provider.

29. The method of claim 27, wherein said computer comprises a personal computer.

30. The method of claim 27, wherein said device comprises an internet appliance.

* * * * *